United States Patent [19]

Murakami et al.

[11] Patent Number: 5,183,443

[45] Date of Patent: Feb. 2, 1993

[54] SPEED REDUCER

[76] Inventors: Hiroshi Murakami, 7-7-303, Hiranohigashi 4-chome, Hirano-ku, Osaka; Tetsu Sakaida, Asahi Plaza, 65-68, Numa 1-chome, Yao-shi, Osaka, both of Japan

[21] Appl. No.: 824,518

[22] Filed: Jan. 23, 1992

[30] Foreign Application Priority Data

Sep. 20, 1991 [JP] Japan ............................ 3-241293
Nov. 28, 1991 [JP] Japan ............................ 3-314683

[51] Int. Cl.⁵ .................... A01D 34/30; F16H 13/08
[52] U.S. Cl. ................................ 475/168; 475/196; 475/231
[58] Field of Search ............ 475/165, 168, 184, 196, 475/331, 332, 334, 344

[56] References Cited

U.S. PATENT DOCUMENTS

| | | | |
|---|---|---|---|
| 2,106,733 | 2/1938 | Goldsborough | 475/196 X |
| 2,528,470 | 10/1950 | Elder | 475/196 |
| 3,227,005 | 1/1966 | Johnson | 475/196 |
| 4,584,904 | 4/1986 | Distin, Jr. et al. | 475/168 |

FOREIGN PATENT DOCUMENTS

| | | | |
|---|---|---|---|
| 354350 | 6/1922 | Fed. Rep. of Germany | 475/168 |
| 129956 | 8/1982 | Japan | 475/196 |
| 133863 | 8/1984 | Japan | 475/196 |
| 1206528 | 1/1986 | U.S.S.R. | 475/196 |
| 1240980 | 6/1986 | U.S.S.R. | 475/196 |
| 771519 | 4/1957 | United Kingdom | 475/196 |
| 1199257 | 7/1970 | United Kingdom | 475/168 |

Primary Examiner—Richard Lorence
Assistant Examiner—Khoi Q. Ta
Attorney, Agent, or Firm—Wenderoth, Lind & Ponack

[57] ABSTRACT

A speed reducer has an input member, an output member provided coaxially with the input member and a cage disposed between opposite surfaces of the input member and the output member. The cage is formed with a plurality of pockets arranged circumferentially at equal intervals. A rolling element is received in each pocket. The output member is formed with recesses arranged circumferentially at equal intervals, the number of which is unequal to the number of the rolling elements. The input member is provided with a contact surface for pressing the rolling elements against the bottoms of the recesses when the input member rotates. In another arrangement, a cylindrical output member is provided around a disk-shaped input member. Disks are rotatably mounted in the input member and having part of their outer periphery protruding from the outer periphery of the input member. Each disk is provided along the outer periphery thereof with recesses arranged at intervals corresponding to the pitch of said rolling elements and engageable with the rolling elements.

1 Claim, 5 Drawing Sheets

SPEED REDUCER

BACKGROUND OF THE INVENTION

This invention relates to a speed reducer for reducing the rotation of an input member and transmitting the reduced rotation to an output member.

As a speed reducer of the type in which an input member and an output member are arranged coaxially to transmit the rotation of the input member to the output member at a relatively high reduction rate, there is known a differential gear device having planet gears.

Such a differential gear type speed reducer is made up of a large number of parts including a plurality of gears. Thus, it tends to be large in size and costly.

SUMMARY OF THE INVENTION

An object of this invention is to provide a compact speed reducer which obviates the abovesaid shortcomings and which can achieve a relatively high reduction rate with a simple structure having a smaller number of parts.

In order to solve these problems, in the first embodiment of the invention, there is provided a speed reducer comprising an input member, an output member provided coaxially with the input member, a cage disposed between the input member and the output member, the cage being formed with a plurality of pockets arranged circumferentially at equal intervals, and a plurality of rolling elements received in the respective pockets, the output member being formed with recesses arranged circumferentially at equal intervals, the number of the recesses being different from the number of the rolling elements, the input member being provided with a contact surface for pressing the rolling elements one after another into the recesses when the input member rotates.

The input member and the output member may both be in the form of disks having shafts. Otherwise, one of the input member and the output member may be in the form of a column with the other in the form of a cylinder.

If both the input and output members are disk-shaped, they should be arranged coaxially so as to oppose to each other with a disk-shaped cage disposed therebetween.

If one of the input member and the output member is in the shape of a column and the other is in the shape of a cylinder, a cylindrical member should be provided outside the column-shaped member so as to be coaxial therewith, with a cylindrical cage disposed between the input and output members.

In order to solve the same problems, in the second embodiment of the invention, there is provided a speed reducer comprising a disk-shaped input member, a cylindrical output member extending along the circumference of the input member, a cage disposed between the input member and the output member, the cage being formed with a plurality of pockets arranged circumferentially at equal intervals between respective inner and outer peripheral surfaces of the input and output members, a plurality of rolling elements received in the respective pockets the output member being provided in the inner peripheral surface thereof with recesses arranged circumferentially at equal intervals, the number of the recesses being different from the number of the rolling elements, and disks rotatably mounted in the input member and having part of their outer peripheral surface protruding from the outer periphery of the input member, each disk being provided along the outer periphery thereof with recesses arranged at intervals corresponding to the pitch of the rolling elements and engageable with the rolling elements.

In both the first and second embodiments, the number of the rolling elements and the number of the recesses are unequal. Thus, only one of the rolling elements can fit snugly into one of the recesses, with the other rolling elements unable to fit in the respective recesses snugly but located offset from the center of the recesses.

Namely, in the first embodiment, only the rolling element which is located opposite to the highest portion of the contact surface formed on the input member can fit completely into the corresponding recess. On the other hand, in the second embodiment, some of the rolling elements are received in some of the recesses of the disks which protrude outwardly from the outer periphery of the input member. Only these rolling elements can fit perfectly into the recesses in the output member.

In the first embodiment, when the input member is turned, the circumferentially arranged rolling elements are pushed by the contact surface one after another to fit perfectly into respective ones of the recesses. The rolling elements are located offset from the centers of the respective recesses before fitting perfectly into the recesses by being pushed by the contact surface. Thus, the output member is rotated by the force produced when the rolling elements get into the recesses, by the amount corresponding to such offsets.

In the second embodiment, when the input member rotates, the disks revolve about the center of the input member and rotate about their respective centers by the engagement between the recesses in the disks and the rolling elements. By such revolving and rotating motion, the circumferentially arranged rolling elements are pushed outward one after another and get into the recesses. Thus the output member rotates.

If the number of the rolling elements is smaller than the number of the recesses, the output member rotates in a direction opposite to the direction in which the input member rotates. If larger, it rotates in the same direction that the input member rotates.

The speed reducer according to the present invention comprises a small number of parts, that is, the input member, output member, cage, and rolling elements and has a very simple structure but can achieve a high reduction rate. Also, it is small in size and can be manufactured easily.

The only additional parts in the speed reducer in the second embodiment are disks. It can achieve effects similar to those of the speed reducer in the first embodiment.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
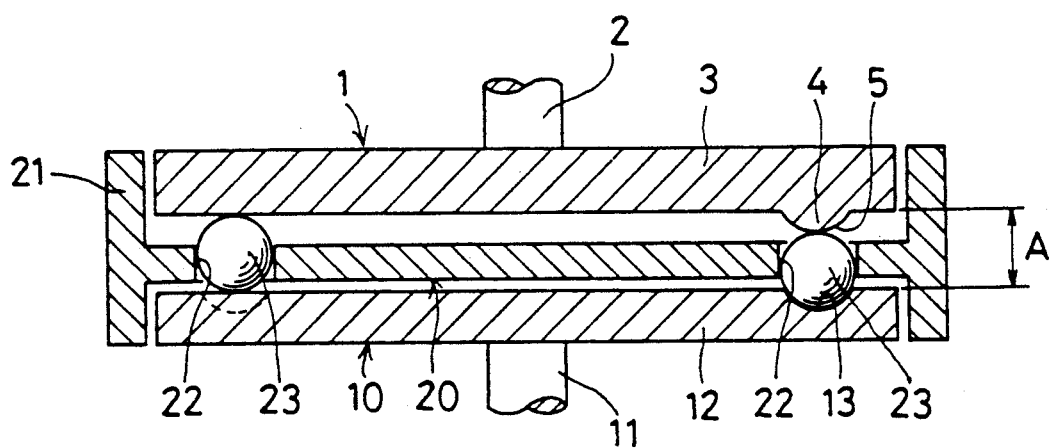
FIG. 1 is a vertical sectional front view of the first embodiment of the speed reducer according to this invention.
Figure 2:
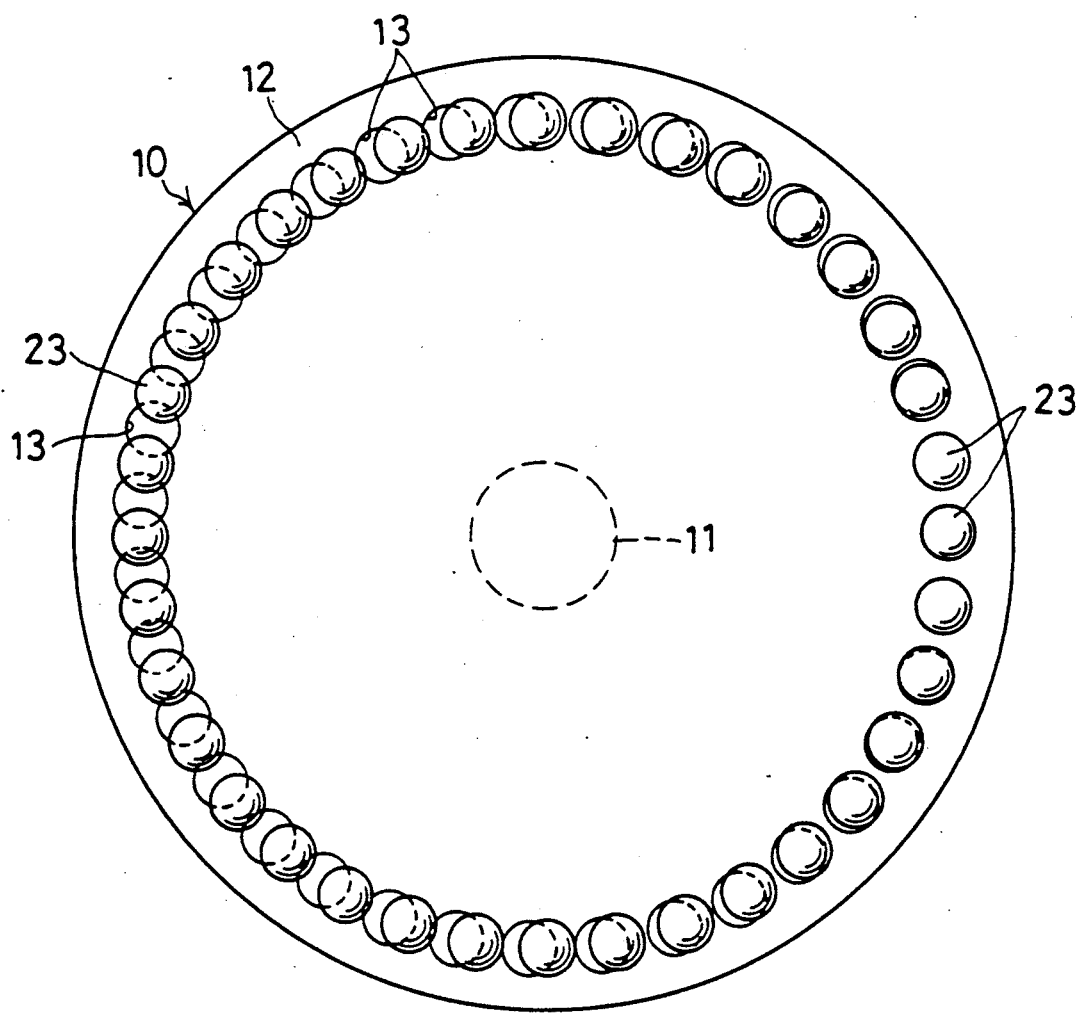
FIG. 2 is a cross-sectional plan view of the same.
Figure 3:
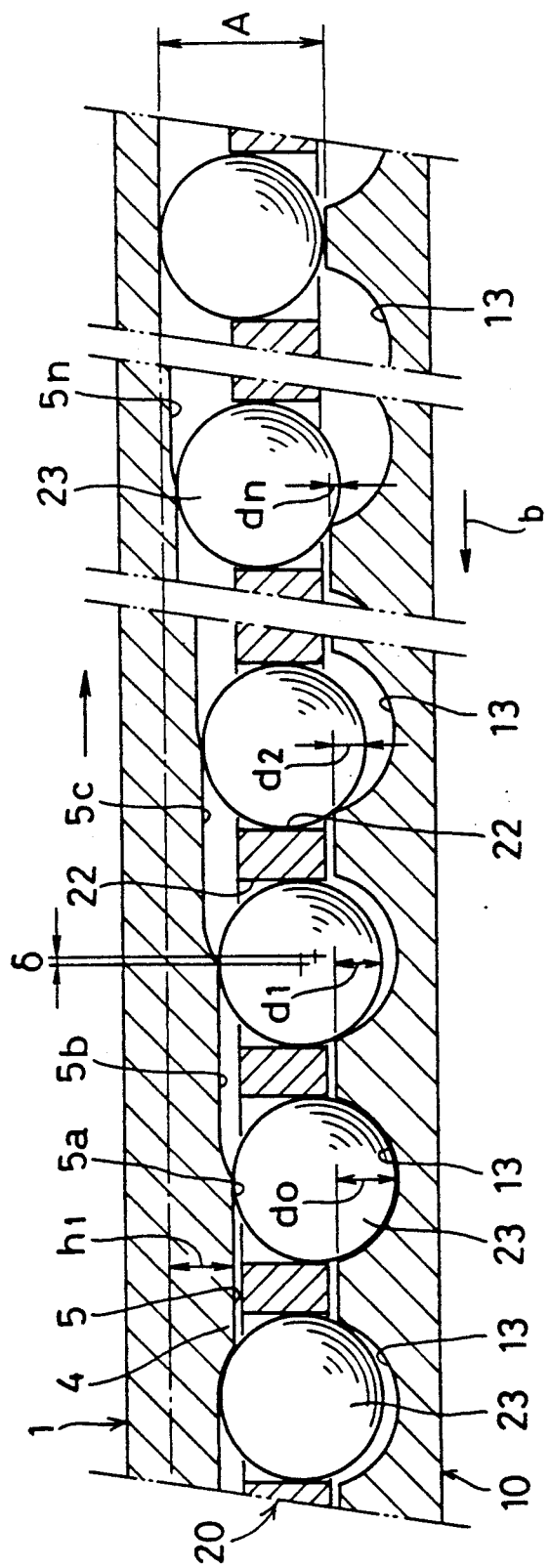
FIG. 3 is a development view of a portion of the same.

FIGS. 1–3 show the first embodiment of the speed reducer according to this invention.

The speed reducer of the first embodiment comprises an input member 1, an output member 10 and a cage 20.

The input member 1 has an input shaft 2 and a disk 3 provided at one end of the input shaft 2. On the other hand, the output member 10 has an output shaft 11 and a disk 12 provided at one end of the output shaft.

The input member 1 and the output member 10 are arranged coaxially with their respective disks 3 and 12 axially opposed to each other. The cage 20 is provided between the disks 3 and 12.

The cage 20 is in the form of a circular plate and has a cylindrical portion 21 axially extending at its outer circumference so as to cover the outer peripheral surfaces of the disks 3 and 12.

A plurality of pockets 22 are formed in the cage 20 near its outer circumference at circumferentially equal intervals. A rolling element 23 is received in each pocket 22.

The rolling elements 23 are in the form of balls having an outer diameter equal to or slightly smaller than the distance A between the opposite surfaces of the disks 3 and 12.

Figure 8A:
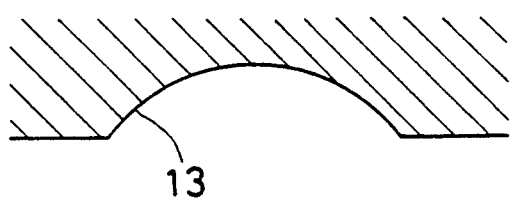
FIGS. 8A–8B are sectional views of other examples of the recesses.
Figure 8B:
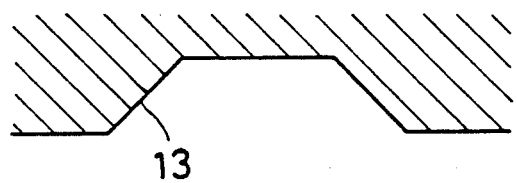
Figure 8C:
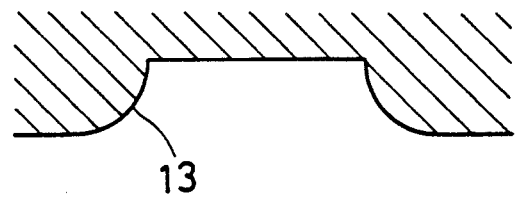

The disk 12 of the output member 10 is provided with a plurality of recesses 13 that extend along the same circular path as that formed by the pockets 22. The number of the recesses 13 is smaller than that of the rolling elements 23. The recesses 13 may be semispherical dents as shown in FIG. 3 or grooves as shown in FIGS. 8A–8C. The grooves to extend radially.

In the embodiment, the number of rolling elements 23 and that of the recesses 13 are 36 and 35, respectively. In this arrangement, with only one of the rolling elements 23 snugly fitted in one of the recesses 13, the other rolling elements 23 are located offset from the centers of the respective recesses 13 by distances δ. The farther apart each of the other rolling elements 23 is from the snugly fitting rolling element, the larger the distance δ. The rolling element located diametrically opposite the snugly fitting rolling element 23 does not extend into the corresponding recess 13 at all but is located between the opposite surfaces of the disk 3 of the input member 1 and the disk 12 of the output member 10. The disk 3 of the input member 1 has protrusions 4 for pushing the rolling elements 23 toward the recesses 13 when the input member 1 is rotated. The protrusion 4 is stepped so as to be the highest at its center and lowering gradually toward both ends thereof. The highest first contact surface 5a has a height h1, which is substantially equal to the depth d0 of the recesses 13. The second contact surface 5b, the third contact surface 5c . . . and the n-th contact surface 5n, which extend continuously from the first contact surface 5a, have heights equal to the depths d1, d2 . . . and dn to which the rolling elements 23 located opposite to the respective contact surfaces 5b, 5c . . . and 5n are received in the recesses 13. In place of such stepped contact surface 5, the entire bottom surface of the disk 3 may be formed into a tapered urging surface which contacts the top of all the rolling elements 23.

In operation, the input member 1 is rotated with the cage 20 fixed to transmit its rotation to the output member 10.

Suppose now that the input member 1 is rotating in the direction of the arrow in FIG. 3 with the cage 20 fixed. Then the circumferentially arranged rolling elements 23 will be pushed by the contact surface 5 of the protrusion 4 to move downward into the recesses 13. Due to the deviation δ of the rolling element 23 being pushed by the first contact surface 5a with respect to the center of the corresponding recess 13, the output member 10 will rotate in the direction of arrow b by the distance equal to the deviation when the rolling element gets completely into the recess. Since the first contact surface 5a pushes the rolling elements 23 one after another, the output member 10 will rotate continuously.

Since the number of the rolling elements 23 is greater than that of the recesses 13, every rotation of the input member 1 will cause the output member 10 to rotate in the opposite direction with respect to the input member 1 by a distance equal to (the number of the recesses minus the number of the rolling elements)/the number of the rolling elements. Namely, if the number of the recesses 13 and that of the rolling elements 23 are 36 and 35, respectively, every rotation of the input member 1 will cause the output member 10 to rotate in a reverse direction by 1/35.

Figure 5:
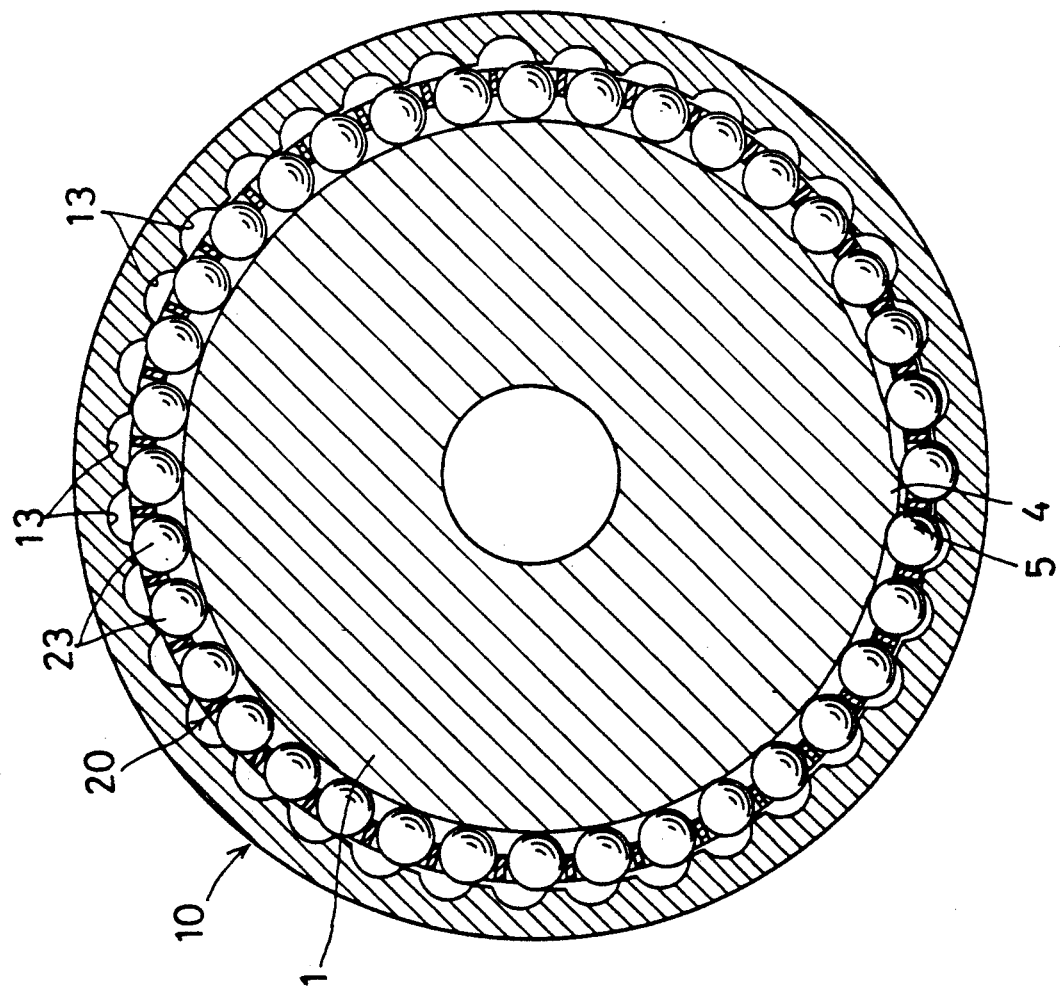
FIG. 5 is a vertical sectional side view of the same.
Figure 4:
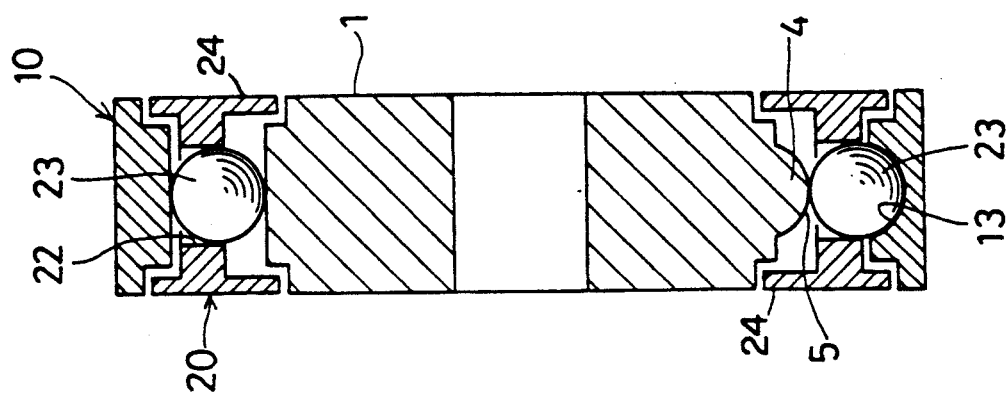
FIG. 4 is a vertical sectional front view of a second embodiment.

FIGS. 4 and 5 show the second embodiment of the speed reducer according to this invention. The second embodiment comprises a cylindrical input member 1, a cylindrical output member 10 coaxially provided around the inner member 1 and a cylindrical cage 20 provided between the members 1 and 10. The cage 20 has flanges 24 to prevent the axial separation of the members 1 and 10 from each other.

A plurality of pockets 22 are formed in the cage 20 at circumferentially equal intervals. A rolling element 23 is received in each pocket 22.

The output member 10 is provided in the inner peripheral surface thereof with recesses 13 at circumferentially equal intervals, the number of which is smaller than that of the rolling elements 23. If the recesses 13 are in the form of grooves as shown in FIG. 8, such grooves should be formed to extend axially.

The input member 1 is provided on the outer peripheral surface thereof with a protrusion 4 having a contact surface 5. The circumferentially arranged rolling elements 23 are pushed into the recesses 13 by the contact surface 5 one after another to allow the output member 10 to be rotated in a reverse direction at a slow speed with respect to the input member 1. In order to smoothly rotate the input member 1 and the output member 10 relative to the cage 20, rolling elements such as balls are preferably interposed between the input member 1 and the flanges 24 of the cage 20 and between the output member 10 and the flanges 24.

In the second embodiment, the columnar input member 1 is provided inside the cylindrical output member 10. But instead a cylindrical input member 1 having a contact surface on the inner periphery thereof may be provided on a columnar output member 10 having recesses on the outer peripheral surface thereof. In place of the protrusion 4, the outer peripheral surface of the input member 1 may be formed into a cylindrical surface as a contact surfaces which urges all the rolling elements 23.

Figure 6:
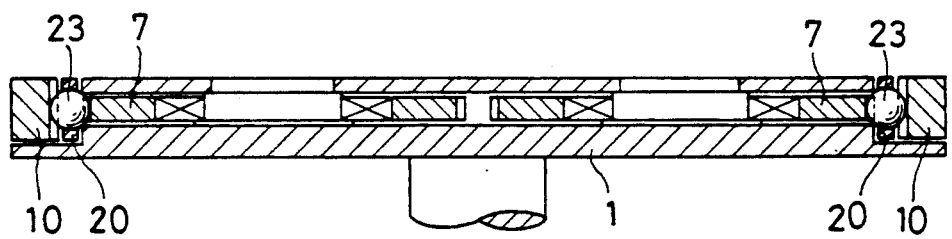
FIG. 6 is a vertical sectional front view of a third embodiment.
Figure 7:
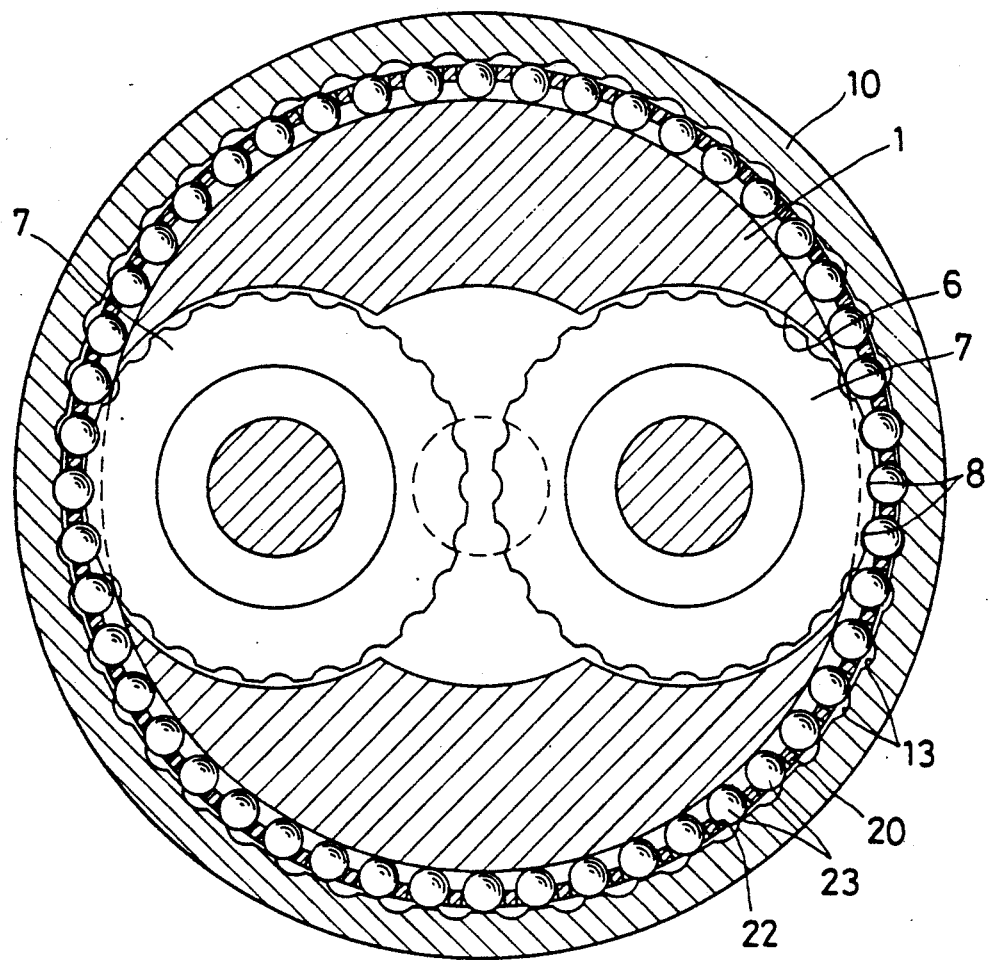
FIG. 7 is a cross-sectional plan view of the same.

FIGS. 6 and 7 show the third embodiment of the speed reducer according to this invention. This embodiment comprises a disk-shaped input member 1, a cylindrical output member 10 provided coaxially around the input member 1 and a cage 20 disposed between the members 1 and 10 and provided with pockets 22 arranged circumferentially at equal intervals. A rolling element 23 is received in each pocket 22.

The output member 10 is provided in its inner peripheral surface with recesses 13 arranged at circumferentially equal intervals, the number of the recesses being unequal to the number of the rolling elements 23.

The input member 1 is formed with a disk housing space 6 which opens to the outer peripheral surface thereof. Disks 7 having part of their outer periphery protruding outwardly from the outer periphery of the input member 1 are rotatably mounted in the disk housing space 6. The disks 7 are provided at and along the outer periphery thereof with recesses 8 spaced apart at such intervals as to correspond to the pitch of the rolling elements 23.

The nubmer of disks 7 is determined according to the difference between the number of the recesses 13 and the number of the rolling elements 23. If the difference is two, two disks 7 are rotatably mounted on the input member 1 in a diametrically opposite relation.

In the third embodiment, when the input member 1 rotates, the disks 7 will revolve about the center of the input member 1 and rotate about their respective centers due to the engagement between the rolling elements 23 and the recesses 8. By the revolving and rotating motion of the disks, the circumferentially arranged rolling elements 23 are pushed outward and into the recesses 13, thus rotating the output member 10.

In the first to third embodiments, the rolling elements 23 are shown as balls. But cylindrical rollers may be used instead. In any of the above embodiments, the number of the rolling elements 23 is greater than the number of the recesses. But the opposite arrangement is possible. In such an case, the output member can be rotated in a circumferential direction at a speed slower with respect to the input member.

What is claimed is:

1. A speed reducer comprising a disk-shaped input member having an outer peripheral surface, a cylindrical output member extending along the circumference of said input member and having an inner peripheral surface opposite the outer peripheral surface of said input member, a cage disposed between said input member and said output member, said cage being formed with a plurality of pockets arranged circumferentially at equal intervals between said peripheral surfaces of said input and output members, a plurality of rolling elements received in said respective pockets, said output member having a plurality of recesses in said inner peripheral surface thereof and said recesses being spaced circumferentially at equal intervals, the number of said recesses being different from the number of said rolling elements, and disks rotatably mounted in said input member and partially protruding radially from said outer peripheral surface of the input member, each said disk being provided along the outer periphery thereof with recesses arranged at intervals corresponding to the pitch of said rolling elements and engageable with said rolling elements.

* * * * *